United States Patent [19]

Demetriou et al.

[11] Patent Number: 5,671,827
[45] Date of Patent: Sep. 30, 1997

[54] AIR DISC BRAKE

[76] Inventors: Ikaros Demetriou, 33 Lovilla Boulevard, Weston, Ontario, Canada, M9M 1C4; Kenneth Peer, 1890 Valley View Rd., Hollister, Calif. 95023

[21] Appl. No.: 554,838

[22] Filed: Nov. 7, 1995

[51] Int. Cl.⁶ ............................................. F16D 65/847
[52] U.S. Cl. ............... 188/71.6; 188/73.32; 188/73.46; 188/218 A; 188/264 AA; 188/72.4; 188/370
[58] Field of Search ................. 188/71.6, 73.1, 188/73.2, 72.5, 72.4, 73.31, 73.32, 366, 367, 264 AA, 250 B, 250 R, 250 G, 264 A, 344, 370, 218 XL, 218 A, 73.46, 73.44, 73.39; 192/113.23, 88 A, 85 AA, 11.2, 113.2, 70.12, 70.13; 301/6.3, 6.8

[56] References Cited

U.S. PATENT DOCUMENTS

| | | | |
|---|---|---|---|
| 3,005,522 | 10/1961 | Butler | 188/72.5 |
| 3,243,017 | 3/1966 | Kleinstuck | 188/72.5 |
| 3,245,500 | 4/1966 | Hambling et al. | 188/73.47 |
| 3,277,985 | 10/1966 | Caskey | 188/264 AA |
| 3,298,469 | 1/1967 | Robinette | 188/72.5 |
| 3,331,473 | 7/1967 | Hayes | 188/72.5 |
| 3,354,992 | 11/1967 | Cook et al. | 188/72.4 |
| 3,469,658 | 9/1969 | Forsythe | 188/72.4 |
| 3,830,345 | 8/1974 | Boyler | 188/366 |
| 3,896,907 | 7/1975 | Baxendale | 188/72.5 |
| 3,955,650 | 5/1976 | Ellis | 188/73.31 |
| 4,031,986 | 6/1977 | Thompson | 188/73.31 |
| 4,055,237 | 10/1977 | Numazawa et al. | 188/73.47 |
| 4,102,438 | 7/1978 | Rancourt | 188/71.6 |
| 4,250,979 | 2/1981 | Kawaguchi | 188/71.6 |
| 4,317,508 | 3/1982 | Katagiri et al. | 188/71.6 |
| 4,326,614 | 4/1982 | Matagrano | 188/245 |
| 4,366,884 | 1/1983 | Montalvo, Jr. | 188/71.3 |
| 4,456,099 | 6/1984 | Kawaguchi | 188/72.5 |
| 4,474,268 | 10/1984 | Dayen | 188/264 AA |
| 4,596,312 | 6/1986 | Kawaguchi | 188/71.6 |
| 4,620,616 | 11/1986 | Martin | 188/264 AA |
| 4,700,813 | 10/1987 | Rath | 301/6.3 |
| 4,860,865 | 8/1989 | Montalvo, III et al. | 188/71.3 |
| 5,178,235 | 1/1993 | Montalvo, III et al. | 188/73.32 |
| 5,188,202 | 2/1993 | Terashima | 188/73.32 |
| 5,242,036 | 9/1993 | Hennessy et al. | 188/73.32 |
| 5,257,679 | 11/1993 | Weiler et al. | 188/73.32 |
| 5,259,483 | 11/1993 | Pelfrey | 188/73.46 |
| 5,343,985 | 9/1994 | Thiel et al. | 188/73.47 |
| 5,363,944 | 11/1994 | Thiel et al. | 188/73.31 |

FOREIGN PATENT DOCUMENTS

| | | | |
|---|---|---|---|
| 0049527 | 4/1982 | European Pat. Off. | 188/71.6 |
| 1353793 | 4/1963 | France | 188/73.32 |
| 1424951 | 2/1965 | France | 188/370 |
| 2154933 | 5/1972 | Germany | 188/264 AA |
| 2814252 | 10/1978 | Germany | 188/264 AA |
| 0180732 | 7/1988 | Japan | 188/73.32 |
| 0079431 | 3/1989 | Japan | 188/73.2 |
| 1207327 | 9/1970 | United Kingdom | 188/71.6 |
| 1339562 | 12/1973 | United Kingdom | 188/73.32 |
| 2053389 | 2/1981 | United Kingdom | 188/73.44 |

*Primary Examiner*—Douglas C. Butler
*Attorney, Agent, or Firm*—John S. Hale; Gipple & Hale

[57] ABSTRACT

A disc brake apparatus comprising an annular brake disc carried by a wheel hub rotatably mounted on an axle, the brake disc being constructed of circular friction plates spaced by a plurality of vanes extending radially along an inner face of the friction plates for enhancing flow of air past the disc and for enhancing dissipation of heat from the disc. A caliper brake assembly is mounted on a stationary support, the caliper brake assembly including a caliper housing, a pair of pistons mounted in the caliper housing and a diaphragm mechanism mounted adjacent and engaging the pistons. A brake pad assembly including brake pads is mounted adjacent to the pistons on the caliper housing and a source of pressurized air communicating fluid pressure from an outside source to the caliper assembly causes an application of force to the brake pad assembly by the pistons so that the brake pads engage with opposite radial faces of the brake disc.

15 Claims, 10 Drawing Sheets

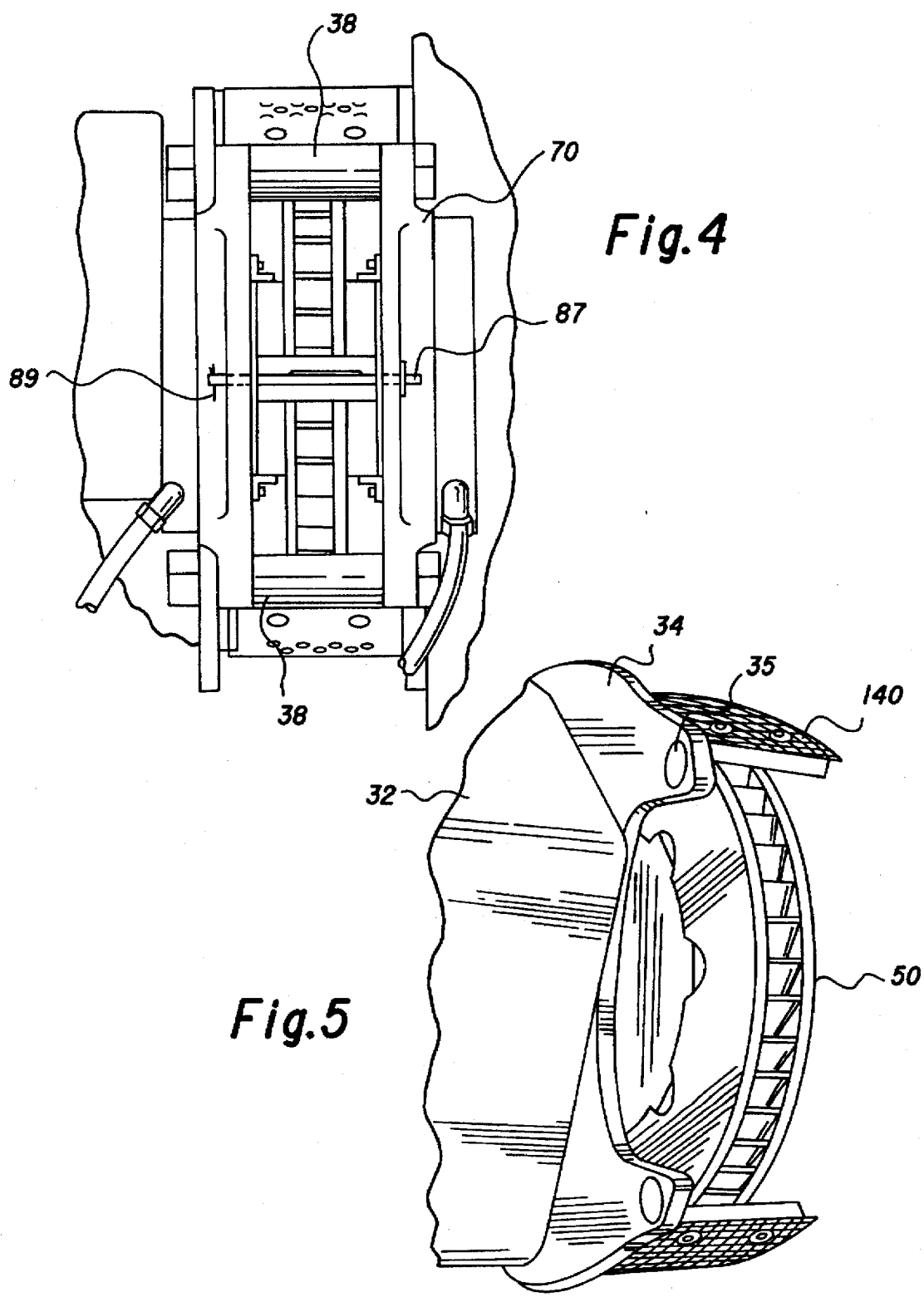

Fig.6
Fig.7
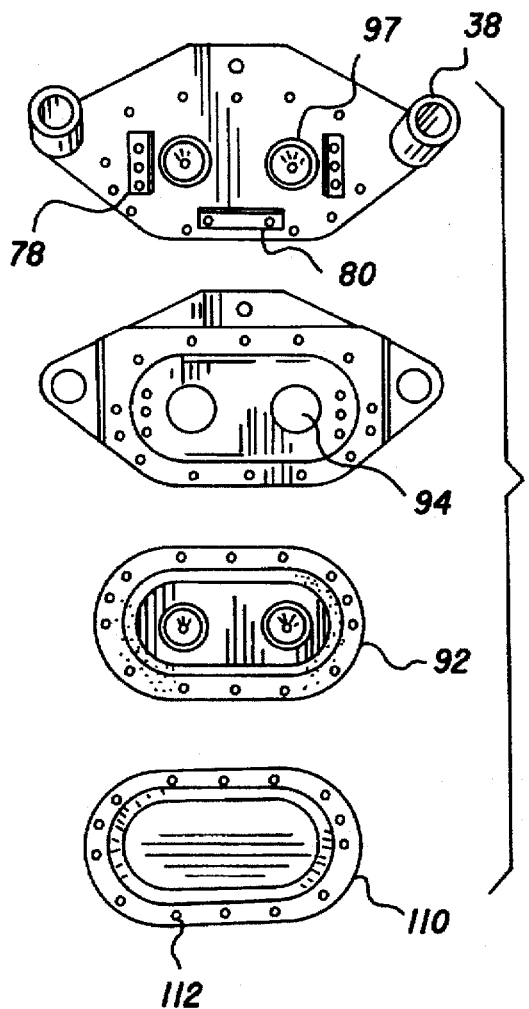
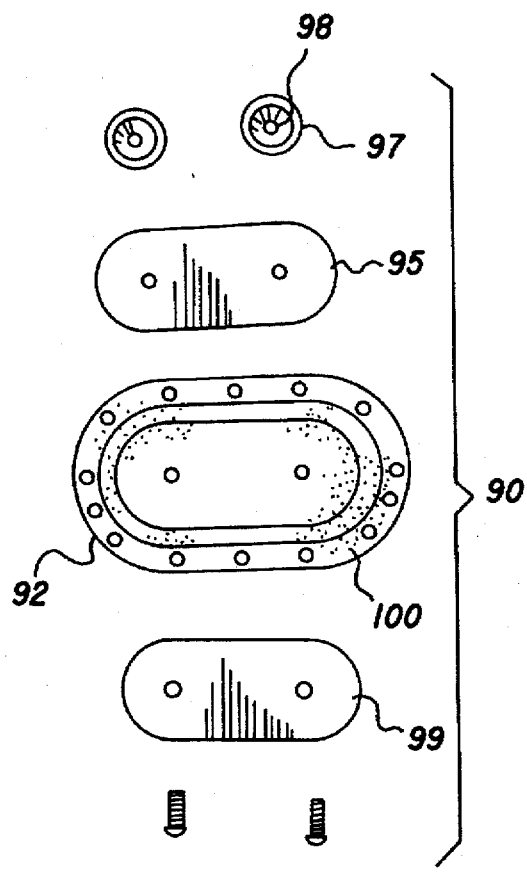

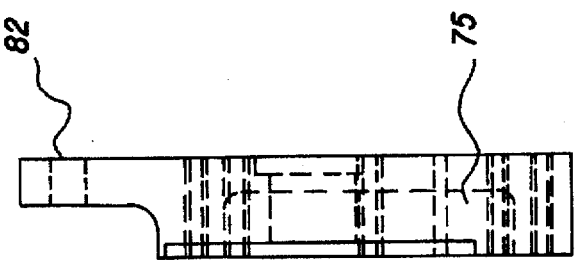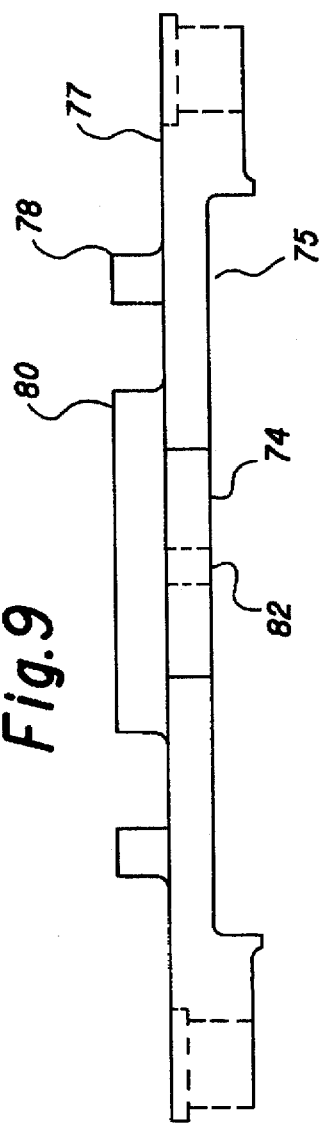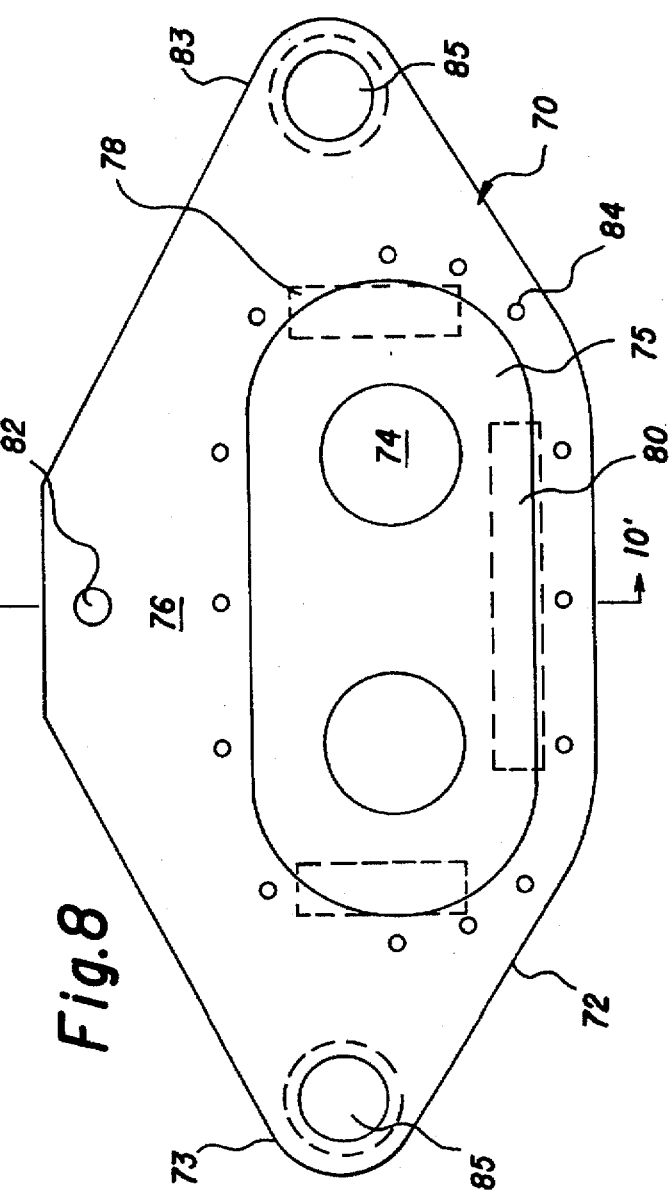

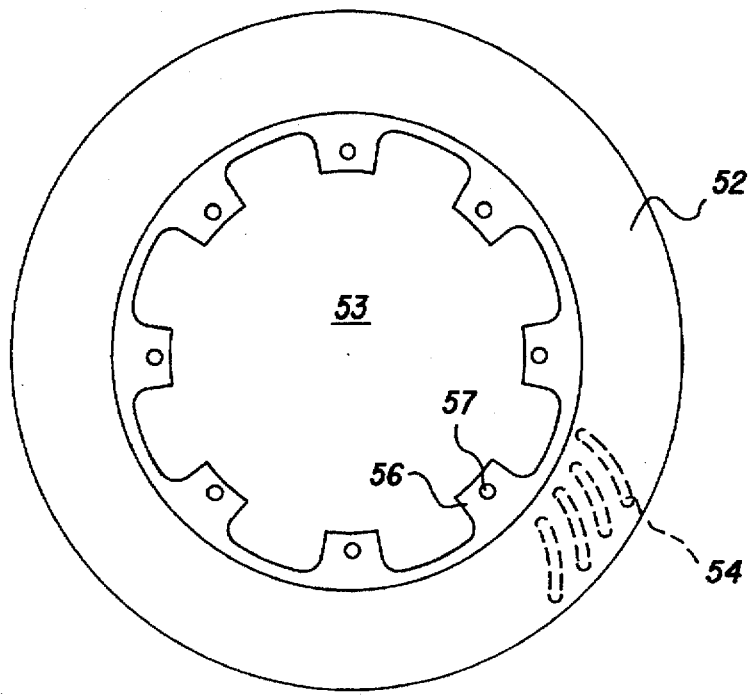
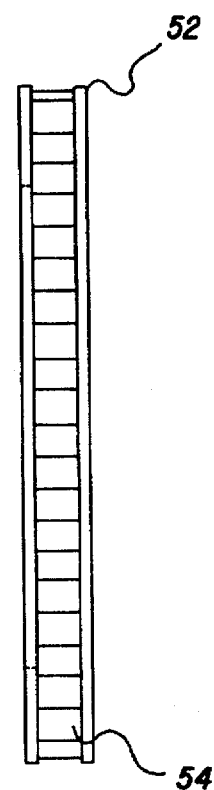
Fig.16                Fig.17
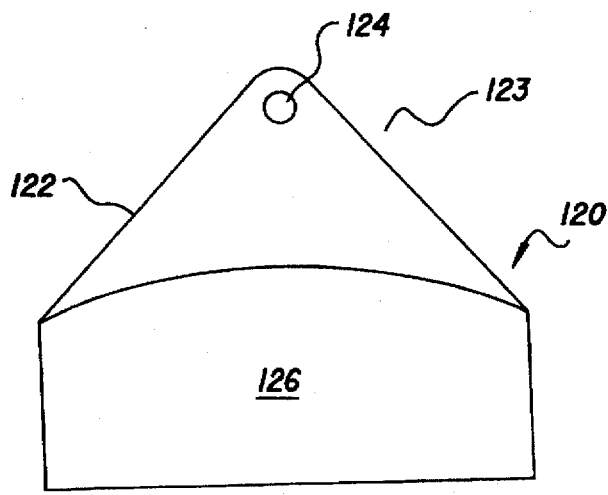
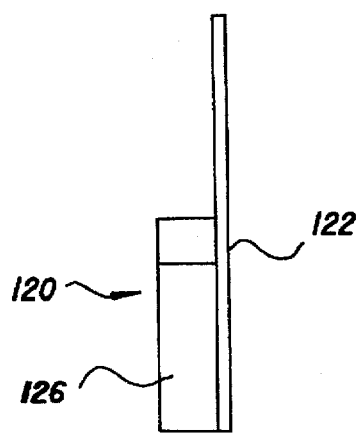
Fig.18                Fig.19

AIR DISC BRAKE

BACKGROUND OF THE INVENTION

1. Field of Invention

The present invention generally relates to the air disc brakes and more specifically is directed toward air disc brakes for shafts or mandrel carrying such articles as paper rolls. The invention includes an annular brake disc rotor carried by a wheel hub and a caliper brake mechanism associated therewith so that when force is applied to the brake pads by a floating pneumatic piston cylinder assembly the brake pads engage the annular brake disc.

2. Background of the Invention

There are a wide number of disc brakes used in a number of related and unrelated industries. At the present time disc brakes are commonly used to stop or retard the movement of all types of machinery and moving vehicles. These brakes operate upon the principle of moving opposed brakeshoes into engagement with the opposite radial side surfaces of a disc secured to the device to be braked or stopped.

Disc brakes have numerous advantages over other types of conventional brakes. The primary advantage is the heat dissipation characteristic which enables the brake to dissipate heat to the atmosphere quickly and thereby maximize braking force.

Even with such an advantage over conventional braking devices there is a tendancy for the brake discs currently being used to overheat upon the application of a braking force thereto with the disadvantages of loss or fading of braking power and the buckling or dissentigration of the brake pad material due to the influence of the thermally induced stresses. It has been considered necessary to construct the disc brake in such a manner that the brake disc is exposed to air flow past the vehicle or brake mechanism.

U.S. Pat. No. 4,456,099 discloses a front wheel assembly for a motorcycle in which the wheel hub is provided with at least one brake disc. The brake pad supports are secured in the body of the caliper brake mechanisms to float relative to the body of the caliper brake mechanisms. The brake disc is provided with a number of axially extending fins which extend towards the wheel hub so that as the wheel hub and brake discs rotate, the brake discs act as impellers to draw air across the face of the brake discs to enhance the dissipation of heat from the respective brake discs.

Another brake disc of interest is shown in U.S. Pat. No. 3,584,709 in which the brake assembly consists of a pneumatic booster cylinder operable upon application of low air pressure to supply high-pressure hydraulic fluid to a pair of opposed hydraulic motors. Actuation of the hydraulic motors moves a pair of opposed brakeshoes into and out of engagement with opposite radial side surfaces of the brake disc. The brake disc is keyed or otherwise fixedly connected to a shaft or other movable element of a machine such that stopping the disc effects braking of the shaft or other element to which the disc is attached.

Another U.S. Pat. No. 4,077,499 is directed toward a disc brake which includes a disc mounted on a rotating shaft and a fixed clamp which carries brake elements which may be moved to and from the disc by controlled pneumatic or hydraulic pressure agents. The fixed clamp is made of two separate shields which are placed in opposing position on each side of the disc and are provided with at least one spring pipe in communication with the pressure system. The clamps and shields carry cooling ribs and are provided with channels for circulating coolant therethrough.

U.S. Pat. No. 3,391,763 discloses a brake disc with spaced annular members or rotors integrally joined together at spaced circumferential points by spacers which are offset at an acute angle from radial planes within the air gap so as to act as fan blades for forcing air through the air gap as the rotor rotates. To further facilitate heat transfer, heat transfer rods formed of copper or other material having a higher coefficient of thermal conductivity than the material of the rotor are received within bores formed in each of the rotor elements and extend into the air gap. The annular members are formed with their central areas removed and integral inwardly extending projections at circumferentially spaced locations, each of which is formed with a cylindrical opening which receives fastening elements so that the rotor may be affixed to a wheel or wheel supporting hub or any other rotating member.

Other related art in the nature of disc brakes having rotors which are provided with surfaces or vanes to enhance cooling are shown by U.S. Pat. Nos. 2,473,040; 2,656,021; 2,728,421; 3,603,435; 3,623,577; 3,999,634 and 4,811,822.

SUMMARY OF THE INVENTION

The present invention is directed toward a disc brake apparatus having an annular brake disc carried and rotated by a wheel or shaft hub. The brake disc is constructed of circular outer friction plates spaced by a plurality of curved vanes extending radially along the face of the friction plates for enhancing flow of air past the disc thus dissipating heat from the disc. A caliper brake assembly carried by a stationary support plate mounted on the housing of the device to be braked includes opposed brake assemblies, each of which includes a caliper housing, a floating piston assembly mounted in a chamber formed in one side of the caliper housing, a diaphragm mechanism mounted adjacent the piston assembly on the caliper housing and a brake pad assembly including a brake pad seated on the other side of the caliper housing which is engaged by the piston assembly being forced through cylinders formed in the caliper housing and communicating with the chamber. Fluid pressure is controlled from an outside source to the diaphragm mechanism and the piston assembly causing an application of force to the brake pad by the pistons so that the brake pad engages with the radial face of the brake disc or rotor.

It is an object of the present invention to provide a curved vane design which pumps a high volume of air for rapid cooling with the thin wall vane design permitting a greater number of vanes and larger surface area without increasing weight.

It is another object of the present invention to provide a device with longer lasting brake pad life and allow replacement of brake pads without the use of tools.

It is yet another object of the present invention to provide for dual floating pistons on each caliper with the pistons made from stainless steel to eliminate corrosion problems.

It is an additional object of the present invention to provide an improved disc brake assembly with purely pneumatic actuation.

It another object of the present invention to provide an inexpensive disc brake assembly which is easily maintained and is not subject to unusual wear or breakdown.

It is an additional object of the present invention to provide a disc brake which can be used as a component of machinery located in factories or shops which have readily available pneumatic air pressure with a rotor diameter allowing pick up and removal of the smallest of butt rolls.

This and other objects of the invention will become clear from an inspection of the detailed description of the invention, and from the appended claims.

In the accompanying drawings, there is shown an illustrative embodiment of the invention from which these and other of objectives, novel features and advantages will be readily apparent.

BRIEF DESCRIPTION OF THE DRAWINGS

FIG. 4 is a front elevation view of the disc brake apparatus shown in FIG. 1 with the caliper guard plate removed;

FIG. 5 is an opposite side elevation view of the disc brake apparatus shown in FIG. 3;

FIG. 6 is a side elevation view of the caliper assembly with the exploded sections of same being seen in an opposite side elevation view;

FIG. 7 is an exploded side elevation view of the gasket and piston assembly shown in FIG. 6;

FIG. 8 is a front elevation view of the caliper housing of the present invention;

FIG. 9 is a top plan view of the caliper housing shown in FIG. 8;

FIG. 10 is a cross sectional view taken along line 10'—10' of FIG. 8;

FIG. 16 is a side elevation view of the rotor with the vanes shown in phantom;

FIG. 17 is a front elevation view of the rotor shown in FIG. 16;

FIG. 18 is a side elevation view of a brake shoe used with the present invention;

FIG. 19 is a front elevation view of the brake shoe shown in FIG. 18;

DETAILED DESCRIPTION OF THE INVENTION

The preferred embodiment and best mode of the invention is shown in FIGS. 1 through 25. The present invention is directed toward an air disc brake for use with rotating shafts such are used on paper or steel rolls. It is envisioned that the same can be used on any shaft or axle.

Figure 24:
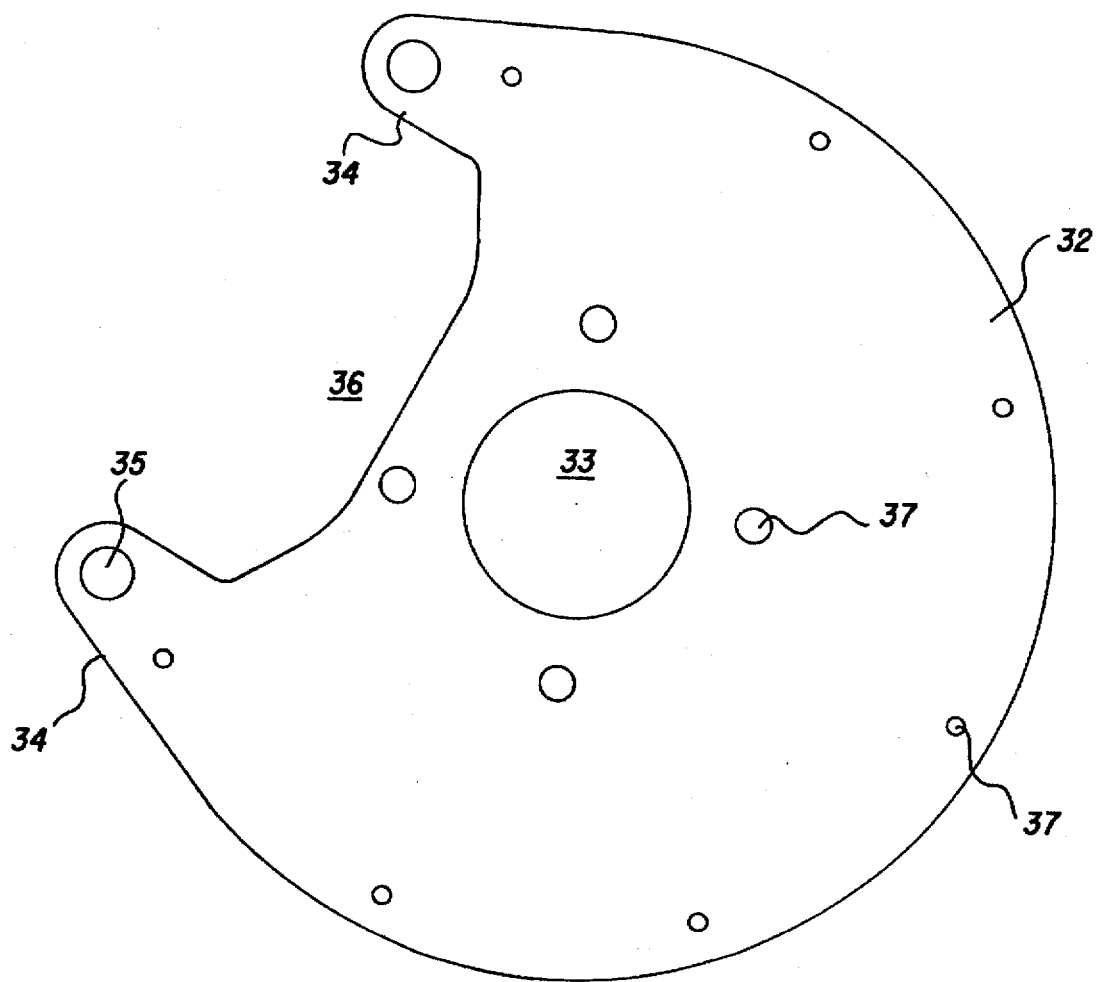
FIG. 24 is a top plan view of the caliper mounting plate used with the present invention.
Figure 25:
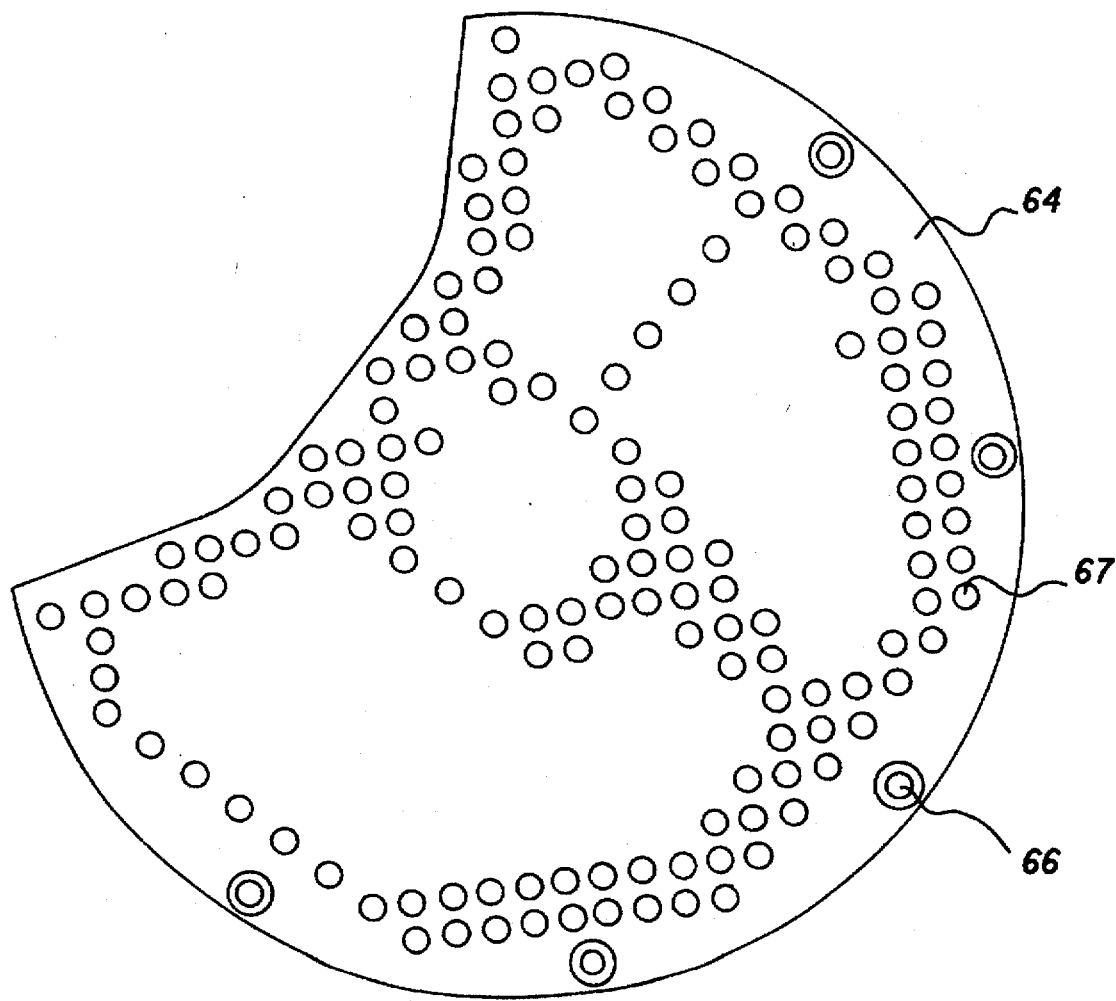
FIG. 25 is a side elevation view of the brake cover plate used with the present invention.

The air disc brake apparatus 30 comprises a hub 40 which is mounted onto a shaft 31 by a keyway or other suitable means to hold the disc or rotor 50. The brake caliper for the rotors are mounted on a carbon steel brake mounting plate 32 of a generally circular configuration with two horns or arms 34 which define a recess 36 extending radially inward toward the center of the mounting plate which is secured to the device being braked. The mounting plate 32 which is most clearly shown in FIG. 24 is provided with a central aperture 33 through which shaft 31 extends. Each of the arms 34 is provided with a centrally positioned aperture 35 to hold caliper assemblies 70 on each side of rotor 50. The mounting plate defines outer spaced apertures 37 positioned around its circumference and inner spaced apertures 39 spaced around its central aperture 33. The outer spaced apertures 37 receive threaded bolts 60 which hold spacer tubes 62 in position so that the brake cover plate 64 can be secured to the spacer tubes via circumferentially spaced apertures 66. The spacer tubes 62 position the plates 32 and 64 a predetermined distance from the rotor 50. The brake cover plate 64 is provided with a number of perforations 67 which facilitate cooling.

Figure 1:
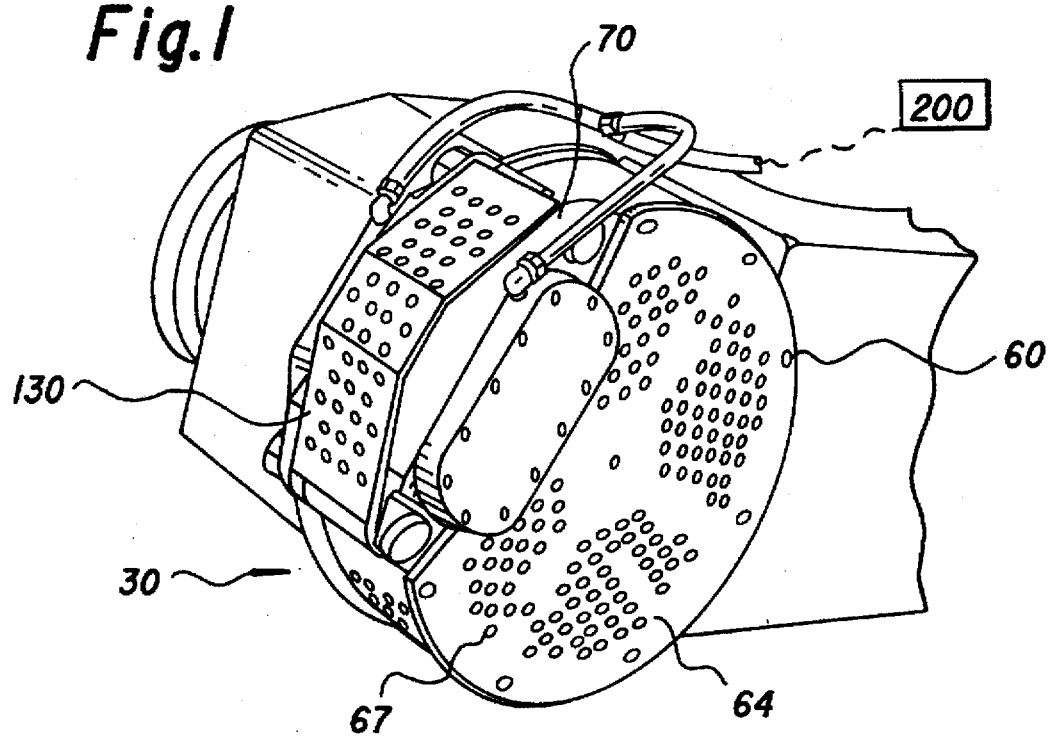
FIG. 1 is a perspective view of the disc brake apparatus with cover plate and caliper guard connected to a paper roll shaft.
Figure 2:
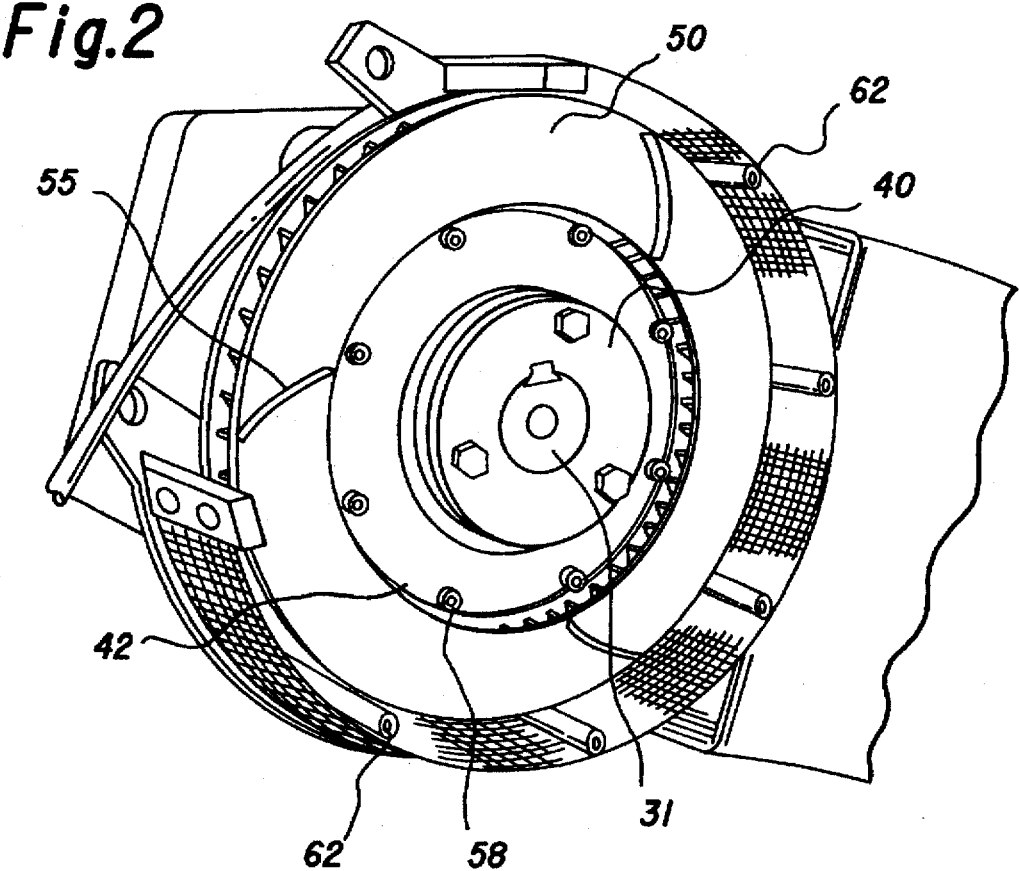
FIG. 2 is a perspective view of the disc brake apparatus of FIG. 1 with cover plate, caliper mechanism and brake pad removed showing the rotor.
Figure 3:
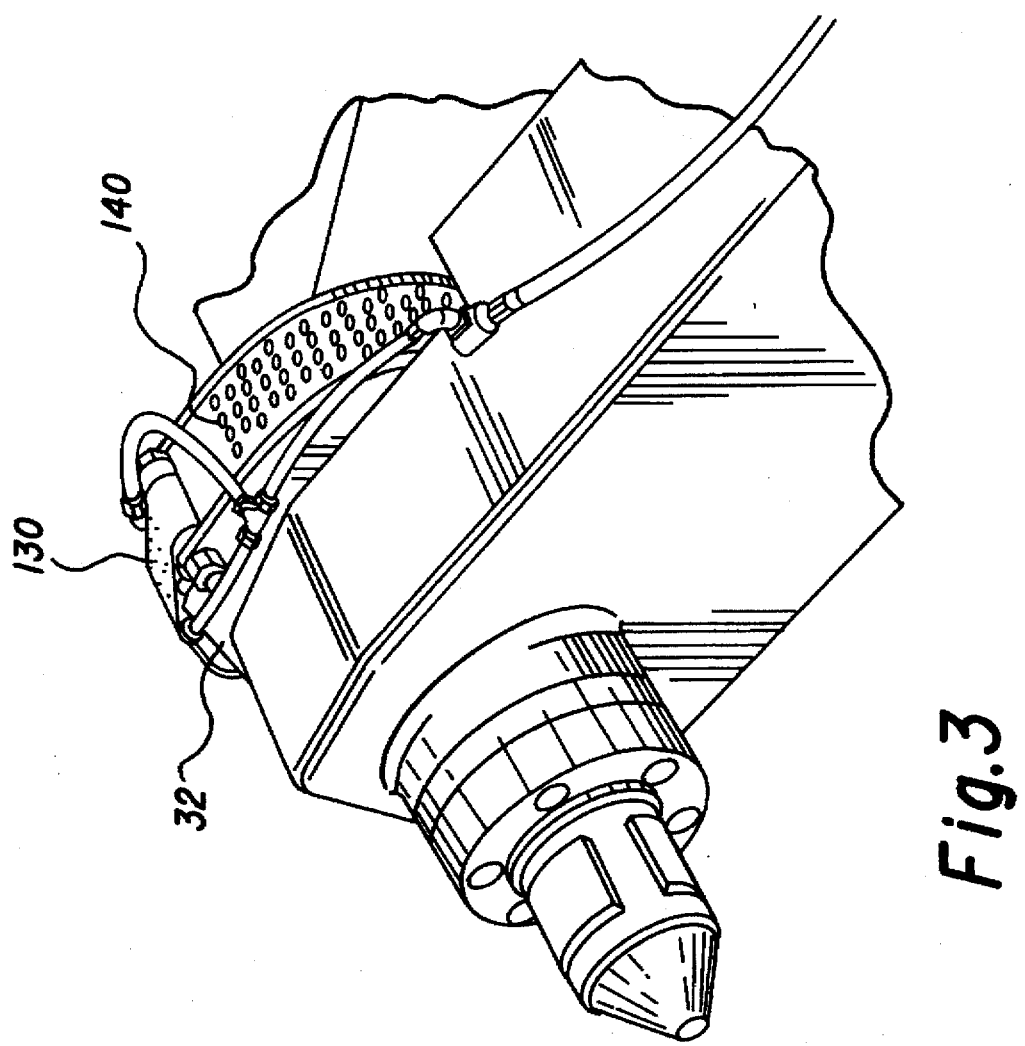
FIG. 3 is a perspective view of the disc brake apparatus of FIG. 1 taken from the opposite side showing the shaft mandrel.
Figures 11, 12:
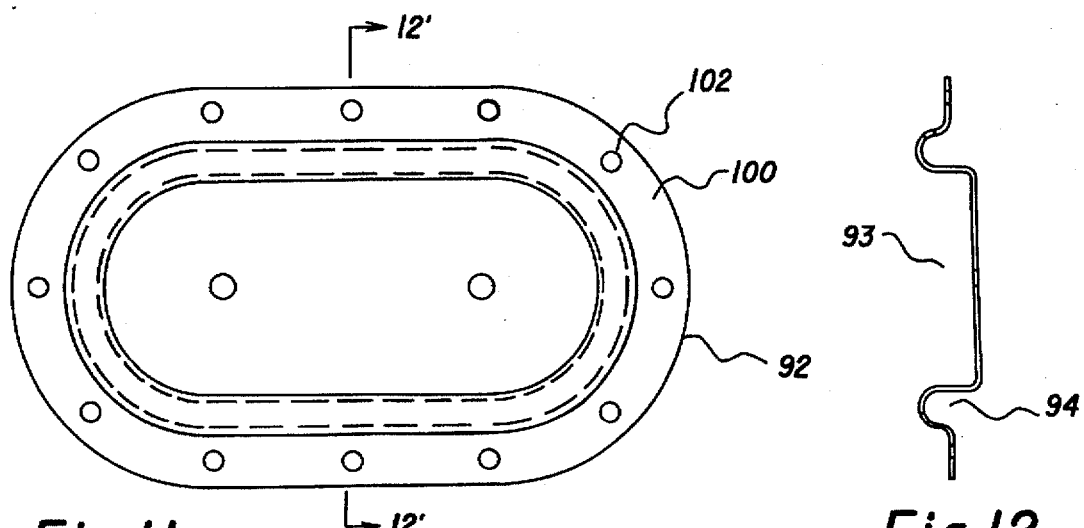
FIG. 11 is a top plan view of the piston diaphragm shown in FIG. 6.
FIG. 12 is a cross sectional view taken along line 12'—12' of FIG. 11.
Figures 13, 15:
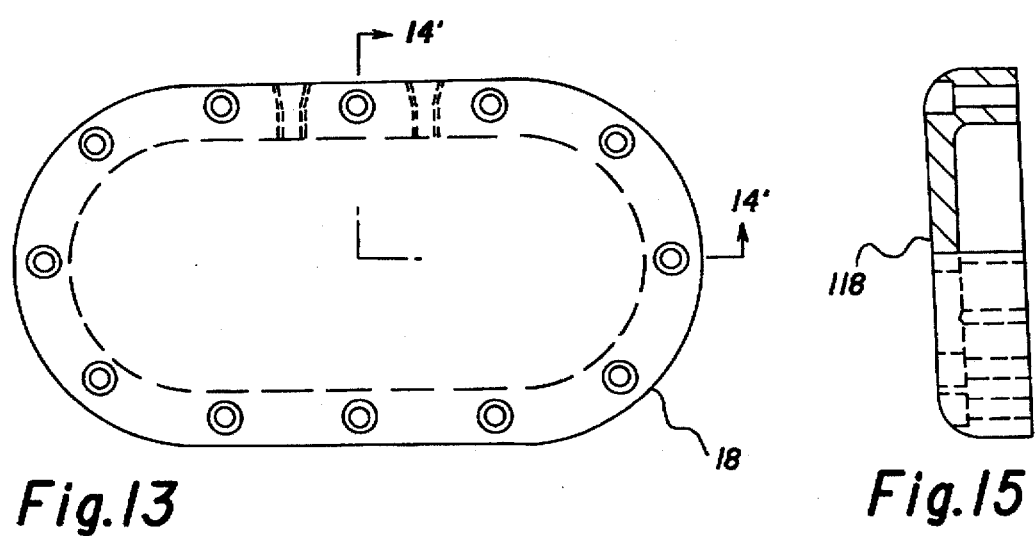
FIG. 13 is a top plan view of the caliper cover.
FIG. 15 is a cross sectional view of the caliper cover taken along line 14'—14' of FIG. 13.
Figure 14:
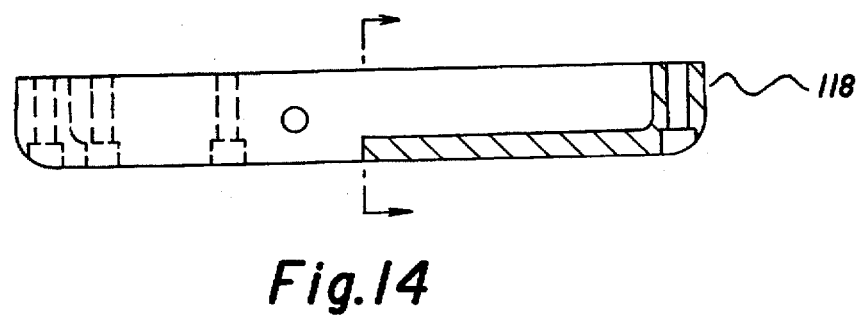
FIG. 14 is a cross sectional view of the caliper cover taken along line 14'—14' of FIG. 13.
Figure 20:
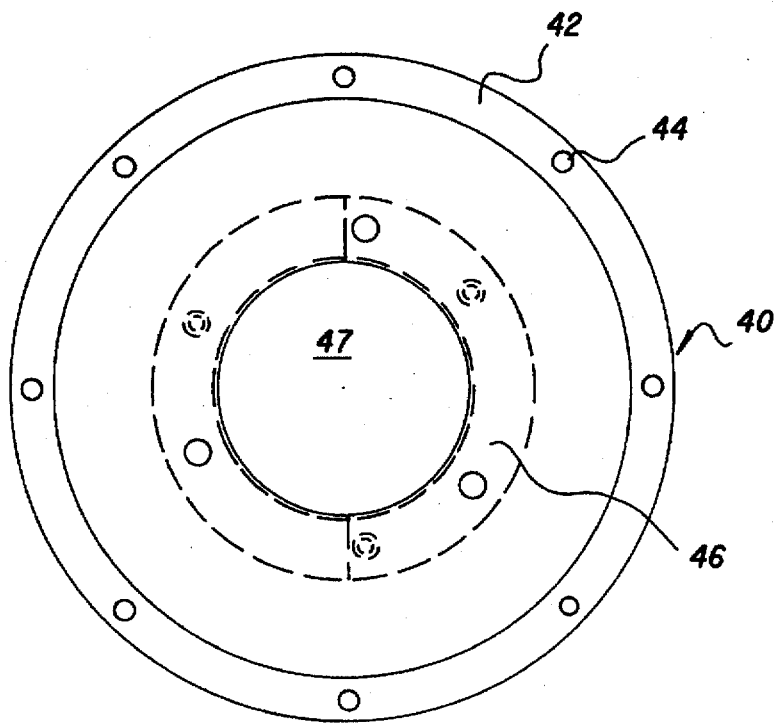
FIG. 20 is a top plan view of the brake hub used with the present invention.
Figure 21:
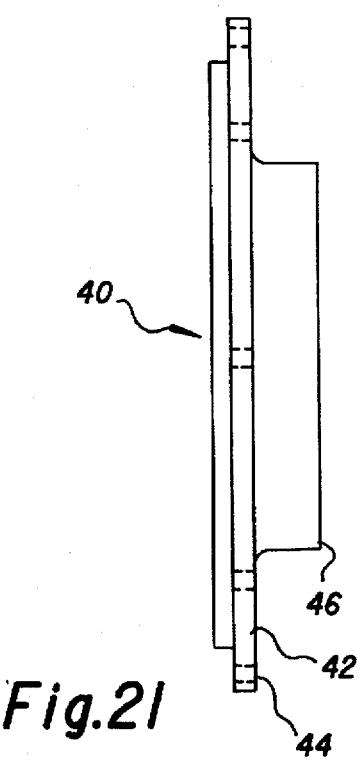
FIG. 21 is a side elevation view of the brake hub shown in FIG. 20.
Figure 22:
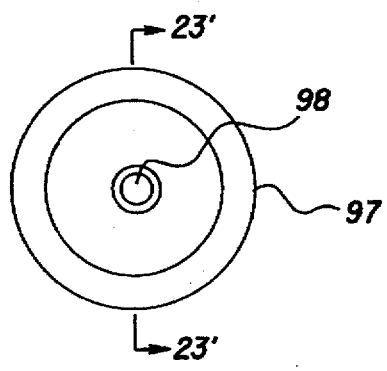
FIG. 22 is a top plan view of a piston used in the present invention.
Figure 23:
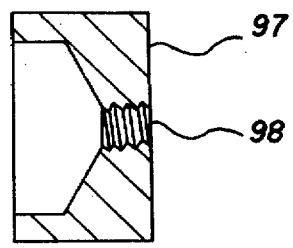
FIG. 23 is a cross sectional view taken along line 23'—23' of FIG. 22.

The shaft or wheel hub 40 as shown in FIGS. 2, 20, and 21 is constructed with an outer circular flange 42 provided with spaced apertures 44 located around its outer periphery and a hub portion 46 defining a central aperture 47 through which the shaft 31 is attached. The outer rim or flange 42 receives and holds rotor 50. The rotor 50 as best shown in FIGS. 16 and 17 has circular proximal and distal friction plates 52 secured to and spaced by a plurality of curved vanes 54 secured to the inner surface of each of the friction plates 52. The thin wall vane permits a greater number of vanes to be used, presently 32 and a larger surface area without increasing weight. The outer surface of the friction plate is blanchard ground for exact flatness to provide a smooth braking surface and is provided with a plurality of face grooves 55 to improve cleaning pad surfaces for more consistent performance. The diameter of the friction plates is preferably small running around 12.2 inches which allows the rotor to be used on almost any machinery and also allows pick up and removal of the smallest of butt rolls. Each rotor plate defines a central substantially circular aperture 53 having integral inwardly projecting projection seats 56. Each projection seat 56 is provided with a cylindrical aperture 57. The projection apertures 57 are aligned with the apertures 44 of the brake hub and are connected by threaded fasteners such as a bolts 58 as is shown in FIG. 2. The vanes 54 serve to cool the brake by passing air across the heated surfaces of the rotor which are engaging the brake shoes. A flexible rotor protection strip 140 is mounted to the cover plate 64 and mounting plate 32 to protect the rotor from debris.

The caliper assembly 70 is mounted on the caliper mounting plate 32 with spacer tubes 38 and bolts as shown in FIG. 4 so that there is a caliper assembly on each side of rotor 50. The caliper assembly 70 as shown in FIGS. 8–10 comprises a housing 72 defining cylinders 74 and ears 73 and 83, each of the ears being provided with a bore 85, the bores being aligned with mounting plate apertures 35 to receive mounting bolts. The housing 72 defines an oval shaped piston diaphragm chamber 75 on its outer side 76 away from rotor 50 and forms a planar surface on its inner side 77 adjacent rotor 50. Two brake pad alignment brackets 78 are aligned in parallel on the inner side 77 of the cylinder housing on each side of cylinders 74 and a seating bracket 80 is also secured on the outer side below the cylinders 74 and perpendicular to the alignment brackets 78 to hold a brake pad member 120. Opposite the seating bracket above the cylinders 74 is found a throughgoing bore 82 which is used to hold a rod 87 which is run through the brake pad plate aperture 124 as shown in FIG. 4 and which will be described more fully in the specification. The rod 87 is held in place by cotter pins 89. The housing also defines threaded blind bores 84 to hold the piston assembly 90 and it's associated diaphragm plate.

An oval shaped piston assembly 90 is mounted in the oval shaped piston chamber 75. The piston assembly 90 includes an oval shaped neophrene rubber body 92 defining an oval depression 93 on one side and an oval shaped channel 94 on the opposite side. The oval shaped depression 93 receives a piston plate 95 having two spaced apertures 96 which hold pistons 97. The pistons 97 which are made up of stainless steel to eliminate corrosion, each have a throughgoing threaded bore 98 which allows them to be secured to a back piston plate 99 via fasteners as shown in FIG. 7. The oval shaped body 92 has an exterior flange 100 provided with a plurality of holes 102 which allow it to be fastened to housing 72 and diaphragm plate 110 so that pistons 97 are aligned with piston cylinders 94. The diaphragm plate 110 is secured to the body 92 via fasteners 111 which extend through holes 112 of the diaphragm plate, holes 100 of body 92 and holes 84 of the housing. The diaphragm plate 110 forms an interior chamber which communicates with a pressurized air source 200 through a valve 116 mounted to the plate. The other side of the plate 110 is provided with a flat planar surface which is covered by cap 118.

The brake pad member 120 which is shown in FIGS. 18 and 19 is constructed of a steel backing plate 122 with a triangular shaped end 123 which defines an aperture 124 near its apex and a frictional brake lining 126. The frictional brake lining or brake pad 126 is a metallized composite brake lining or KEVLAR® (poly(p-phenyleneterephtalamide)) material which has a high coefficient of thermal conductivity and tends to have a more stable friction coefficient as its temperature increases and is bonded to the steel backing plate 122. The brake pad member 120 is seated on seating bracket 80 between the parallel guide brackets 78 and is mounted on rod 87. When the pistons 97 are energized they engage the steel backing plate 122 forcing the brake pad 126 against the rotor plate surface to achieve braking.

In operation the rotor is turned by the rotating shaft and the shaft is braked by the frictional engagement of the brake shoes on the ground flat friction rotor sides. Air pressure fills the chambers of the calipers so that diaphragms inside the calipers actuate dual pistons which force out the brake pads into engagement with the brake disc. When air pressure is stopped pressure is released on the pistons and thus on the brake pads. If a brake pad or shoe is desired to be replaced for wear or for any other reason, the caliper protection strip 130 is removed, a cotter pin 89 is removed from rod 87 and the rod is pulled out of the assembly. The brake pad 120 is lifted out from its seat 80 and a new brake pad 120 is inserted down between guide brackets 78 onto the seat 80 which aligns the plate aperture 124 for insertion of rod 87. Rod 87 is then held in place by the reinsertion of cotter pin 89 and the brake is ready to be used once the caliper protection strip has been replaced.

In the foregoing description, the invention has been described with reference to a particular preferred embodiment, although it is to be understood that specific details shown are merely illustrative, and the invention may be carried out in other ways without departing from the true spirit and scope of the following claims:

What is claimed is:

1. A disc brake apparatus comprising an annular brake disc carried by a wheel hub, said brake disc comprising circular friction plates secured to and spaced by a plurality of vanes extending radially along an inner face of each said friction plates for enhancing the flow of air past the disc and for enhancing dissipation of heat from the disc, the hub being rotatably mounted on an axle, a stationary support mounted adjacent said brake disc and a plurality of caliper brake assemblies, mounted to said stationary support, said caliper brake assemblies being spaced apart from each other by spacer means and positioned on opposite sides of said brake disc, each caliper brake assembly comprising a caliper housing, piston means moveably mounted in said caliper housing, a brake pad assembly including a brake plate with a brake pad secured thereto movably mounted on said caliper housing and positioned by support and guide means extending from said caliper housing and means connected to one end of said caliper housing for communicating air under pressure from an outside source to said piston means causing an application of force to said brake pad assembly by said piston means so that the brake pads engage with opposite outer faces of said friction plates of said brake disc.

2. A disc brake apparatus as claimed in claim 1 wherein said brake disc vanes are curved and said friction plate defines an open central area with a surrounding exterior surface which is blanchard ground with a plurality of face grooves.

3. A disc brake apparatus as claimed in claim 2 wherein said open central area is generally circular in configuration with a plurality of spaced inwardly projecting ribs.

4. A disc brake apparatus as claimed in claim 1 wherein each of said caliper brake assemblies comprises a housing defining cylinder means, a piston assembly mounted in said housing and a diaphragm plate covering said piston assembly, said diaphragm plate being provided with air source means.

5. A disc brake apparatus as claimed in claim 4 wherein each of said piston assemblies comprises a flexible member, a front plate mounted on said flexible member, a back plate mounted on said flexible member and pistons mounted to said front plate and back plate.

6. A disc brake apparatus as claimed in claim 1 wherein said caliper housing support and guide means for said brake pad mounted thereon comprises a plurality of brackets mounted to said housing and a rod assembly mounted to said housing.

7. A disc brake apparatus as claimed in claim 1 wherein said braking plate has a triangular shaped section which extends past the brake pad section, said triangular section defining a throughgoing hole adapted to receive a slidable rod.

8. A disc brake apparatus as claimed in claim 1 including a flexible cover strip covering said rotor and a flexible cover for each of said caliper assemblies.

9. A brake assembly for stopping rotation of a rotary disc, said brake assembly comprising;
    a pair of opposed braking elements moveably mounted to respective caliper assemblies, said caliper assemblies being spaced apart from each other by spacer means and positioned on each side of said rotary disc, said braking elements being adapted to be selectively moved into engagement with opposite radial side surfaces of said rotary disc;

said caliper assemblies being operable to control movement of said braking elements into and out of engagement with said rotary disc, each of said caliper assemblies comprising a caliper housing, cylinder means defined in said caliper housing and piston means moveably mounted in said cylinder means, said piston means comprising a flexible moveable member, a front plate, mounted on said flexible member, a back plate mounted on the opposite side of said flexible member and at least one piston member mounted to said front plate and back plate, and a source of pressurized air communicating with said caliper housing and associated flexible member such that admission of air pressure causes said piston means to be extended so as to move against braking elements driving said braking elements into engagement with said rotary disc and stopping rotation of said disc.

10. A disc brake assembly as claimed in claim 9 wherein said caliper housing is provided with support means for said braking elements.

11. A brake assembly as claimed in claim 10 wherein each said braking element comprises a support plate, a friction pad mounted on said support plate and support means connecting said support plate to said caliper housing.

12. A brake assembly as claimed in claim 10 wherein said support means comprises a rod slidably mounted in said caliper housing and extending through a braking element, said rod being provided with removable fastener means.

13. A brake assembly as claimed in claim 9 wherein said caliper housings are mounted on a support plate, said support plate defining a plurality of arms, one of said caliper assemblies mounted on said arms, tube means spacing a second caliper assembly from said first caliper assembly and fastener means connecting said caliper assemblies, tube means and support plate arms.

14. A disc brake apparatus comprising an annular rotor disc carded by a wheel hub to be braked, said rotor disc comprising circular plates spaced by a plurality of curved vanes extending radially along the face of said plates for enhancing the flow of air past the rotor and for enhancing dissipation of heat from the rotor with the outer surface of said circular plates being adapted to be frictionally engaged by a brake pad, said wheel hub being rotatably mounted on a shaft, a plurality of caliper brake assemblies are carried by a stationary support and spaced from each other by spacer means positioned on each side of said rotor disc, each caliper brake assembly comprising a caliper housing, a piston means mounted in a chamber formed in said caliper housing, diaphragm means mounted adjacent and connected to said piston means on said caliper housing, a brake pad assembly comprising a brake pad plate and a brake pad moveably mounted on said caliper housing between support and guide means mounted on said housing, and means connected to one end of said caliper assembly for communicating pneumatic pressure from an outside source to said caliper assembly causing an application of force to said brake pad assembly by said piston means and associated diaphragm means so that the brake pads engage the opposite radial faces of said rotor disc to stop rotation of said rotor disc.

15. An air brake apparatus, comprising:

a rotor assembly with spaced connected friction plates spaced apart by a plurality of vane members which cooperate to form a plurality of air passages between the friction plates;

a stationary support plate mounted adjacent said rotor assembly;

a plurality of brake caliper assemblies including a first brake caliper assembly and a second brake caliper assembly, each secured to said stationary support and positioned on opposite sides of said rotor assembly plate, each caliper assembly comprising;

a housing defining a chamber on a side of said housing distal from said rotor assembly and defining a plurality of cylinders in said chamber;

a diaphragm member defining a plurality of apertures therein mounted in said housing chamber;

a piston plate defining a plurality of apertures mounted on said diaphragm member on the side proximal to said housing so that said diaphragm apertures and piston plate apertures are aligned;

a back plate defining a plurality of apertures mounted on said diaphragm member on the side distal from said housing such that the apertures in said diaphragm, the apertures in said back plate and the apertures in the piston plate are aligned to form a throughgoing apertures;

a plurality of pistons mounted on said piston plate by fastening means extending through said throughgoing apertures said pistons being slidably mounted within said cylinders;

a cap member mounted to said caliper housing covering said diaphragm member;

an air pressure source in communication with each cap member which selectively drives said diaphragm member and associated pistons;

a brake pad assembly comprising a brake plate and a brake pad secured to said brake plate, said brake plate extending past the end of said brake pad, pin means mounted on each caliper housing to support said brake pad assembly, said brake pad assembly being positioned between guide members extending from said caliper housing, with said brake plate being engaged by said pistons when selectively driven by air pressure against said diaphragm member so that said brake pad frictionally engages a friction plate of said rotor assembly; and a removable cover means mounted on said stationary support plate to cover said rotor assembly.

* * * * *